Oct. 11, 1932.   H. W. ALDEN ET AL   1,882,469
CAR TRUCK
Filed Nov. 18, 1927   3 Sheets-Sheet 1
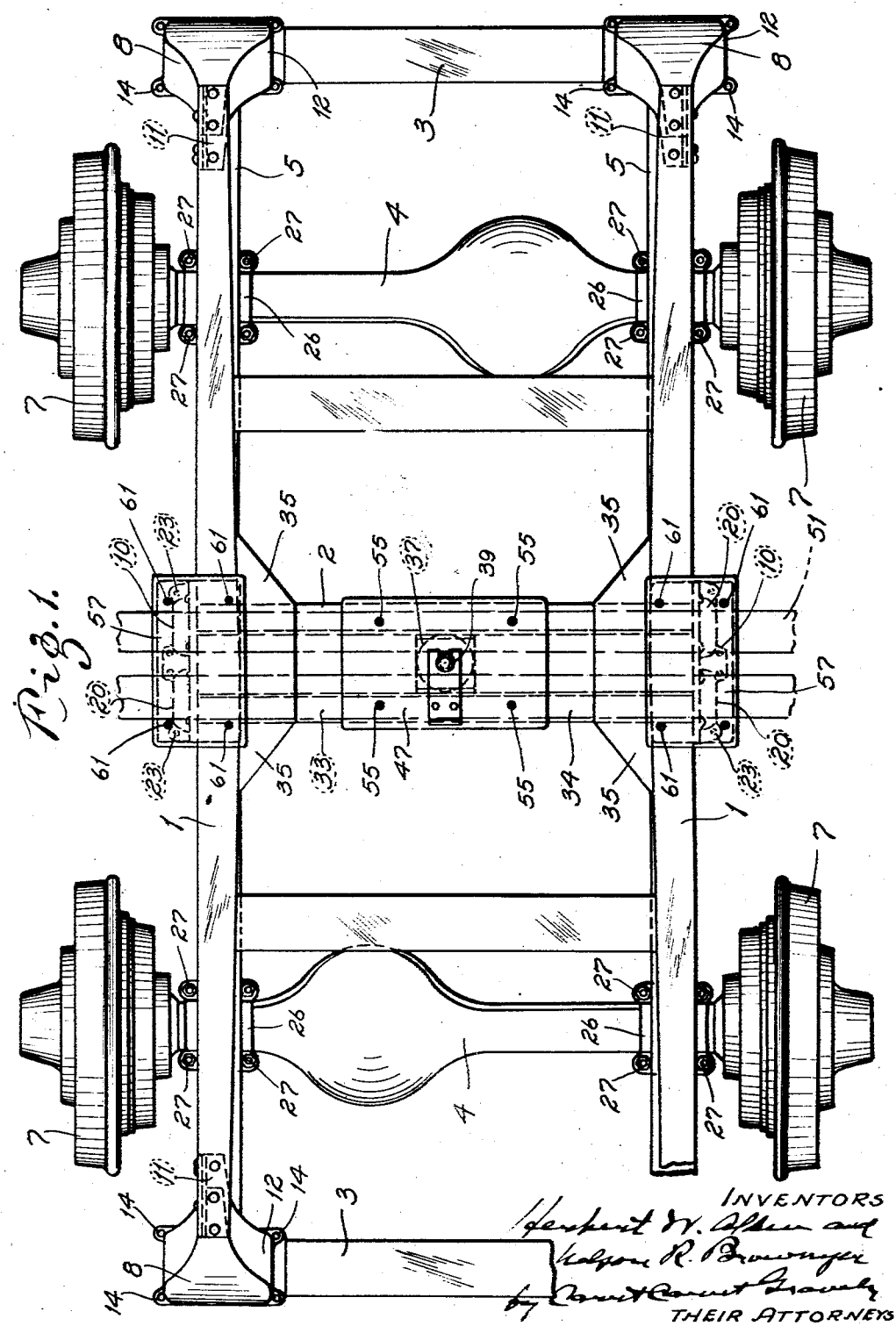

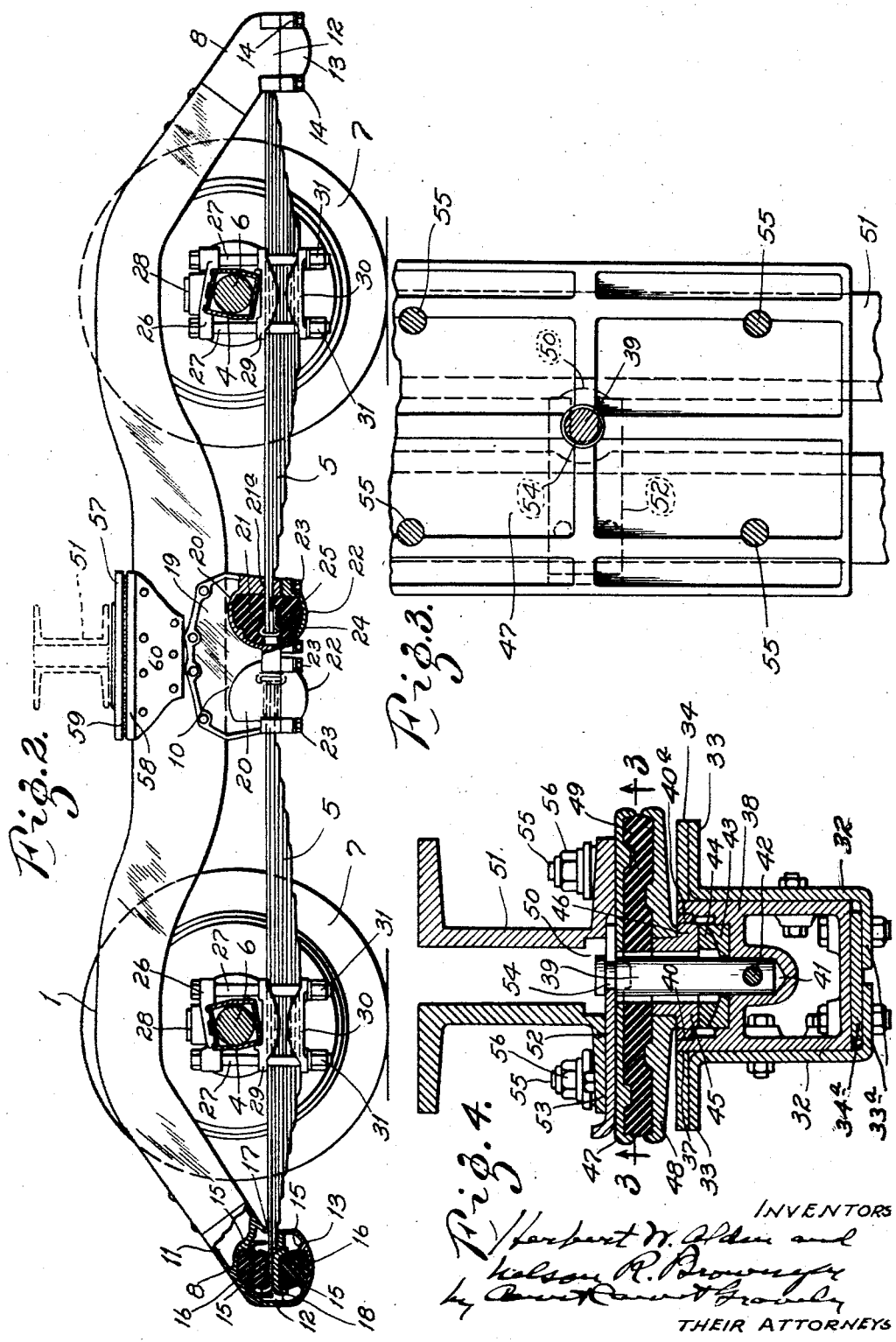

Oct. 11, 1932.  H. W. ALDEN ET AL  1,882,469
CAR TRUCK
Filed Nov. 18, 1927  3 Sheets-Sheet 3
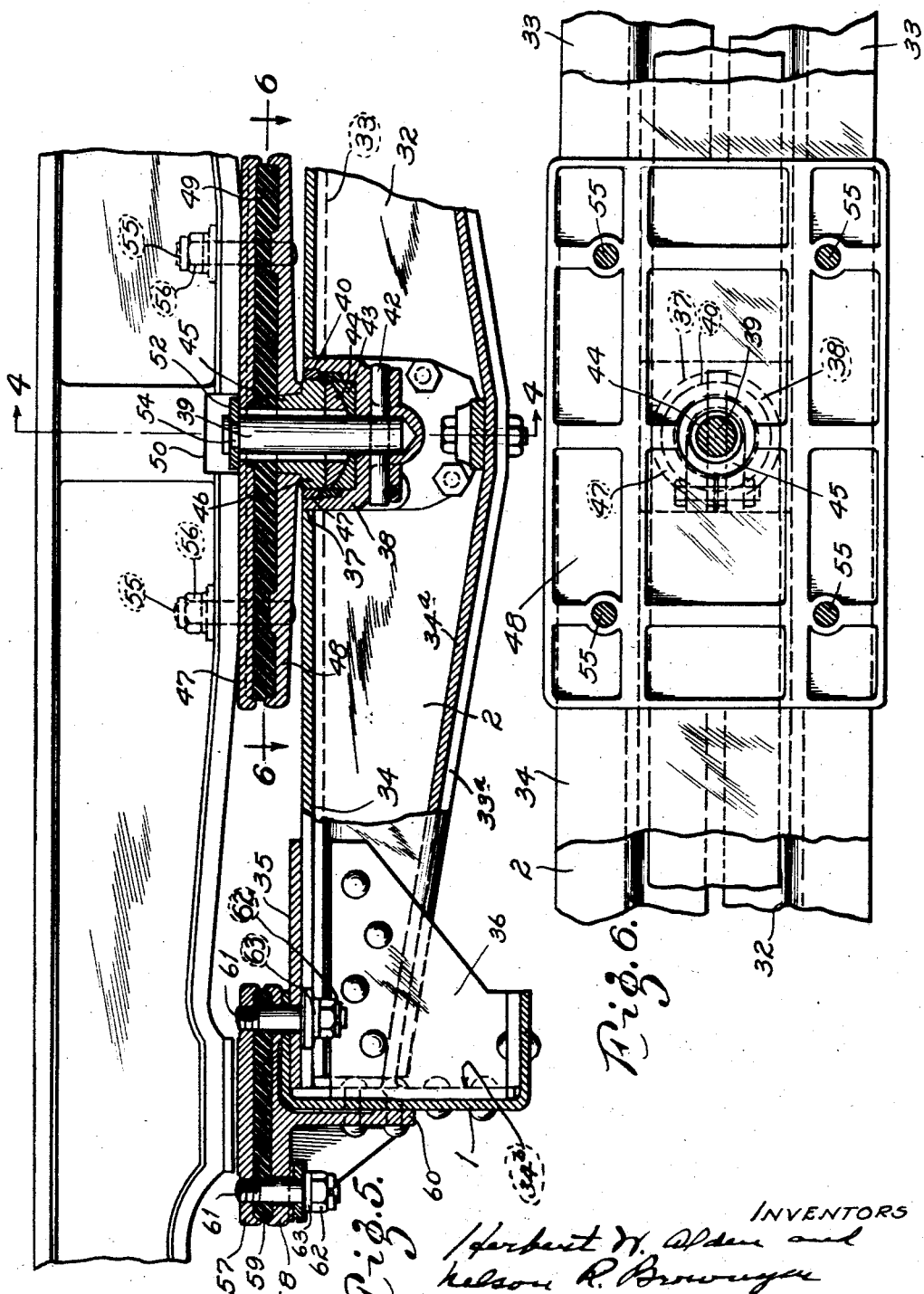
INVENTORS
Herbert W. Alden and
Nelson R. Brownyer
by Carr and Carr Gravely
THEIR ATTORNEYS Patented Oct. 11, 1932

1,882,469

UNITED STATES PATENT OFFICE

HERBERT W. ALDEN AND NELSON R. BROWNYER, OF DETROIT, MICHIGAN, ASSIGNORS TO THE TIMKEN-DETROIT AXLE COMPANY, OF DETROIT, MICHIGAN, A CORPORATION OF OHIO

CAR TRUCK

Application filed November 18, 1927. Serial No. 234,094.

This invention relates to car trucks, especially such as are used in connection with street cars. One of its principal objects is to deaden the noise, jar and vibration. It consists in the parts and in the arrangements and combinations of parts hereinafter described.

In the accompanying drawings wherein like numerals refer to like parts wherever they occur, Fig. 1 is a plan view of a street car truck embodying our invention, a body bolster being shown in dotted lines, Fig. 2 is a side elevation of said truck with parts shown in section, Fig. 3 is a horizontal section through the center bearing on the line 3—3 in Fig. 4, Fig. 4 is a vertical cross section through the axis of the center bearing on the line 4—4 in Fig. 5, Fig. 5 is a vertical longitudinal cross section through one-half the truck bolster, the body bolster being shown in elevation; and Fig. 6 is a horizontal section through the center bearing on the line 6—6 in Fig. 5.

The present truck comprises side frames 1 rigidly connected together about midway of their length by a bolster 2 and at their ends by end members 3. It also comprises axle housings 4, springs 5 for holding said axle housings in proper relation to the truck frame, and a live axle 6 in each housing together with road wheels 7 fixed on each axle.

Each truck side frame 1 is preferably made in a single piece, either as a casting or preferably of pressed steel. In the design illustrated in the drawings, the middle portion of the side frame 1 is of maximum depth midway of its length and decreases towards each end, being flanged at both top and bottom throughout its length to increase its strength. Throughout its middle portion, the top of the side frame is below the top of the wheel and thus affords ample space for deep truck and body bolsters. The bottom of the side frame is close to the line that joins the center lines of the axles. From this middle portion, the truck side frame inclines upwardly to a maximum height above the axle and thence beyond and downwardly below the level of the axle at each end of said frame. Each end of the side frames 1 is provided with a fitting 8 or is otherwise adapted to receive the end of the supporting spring 5: a middle portion of each side frame is provided with a fitting 10 that is rigidly secured thereto and depends therefrom and is adapted to receive the inner ends of the supporting springs 5. These springs 5 are leaf-springs of common type and are shackled against the bottom of the axle housing.

Each leaf-spring 5 is about half the length of the side frame and has one end mounted at one end of the side frame and the other end mounted near the middle of the side frame. The fittings 8 at the ends of the side frame have a shank portion 11 of substantially the same cross section as the end portion of the side frame against which they fit and to which they are riveted or otherwise rigidly secured. The projecting portions of these end fittings are in the form of housings or chambers 12 that open downwardly to form a hollow chamber that is closed by a cap or closure plate 13 secured to the bottom of said fitting by cap screws 14 or like devices. In the interior of the top of the housing or chamber and also on the interior of the closure cap forming the bottom of said chamber are transversely extending ribs 15 spaced from the front and back walls of said housing. Blocks 16 of rubber or other suitable resilient material are mounted between these ribs on the upper and lower sides of the leaf spring, which projects into said housing through an opening 17 provided therefor in the inner wall thereof, that is, in the back wall of the front housing and the front wall of the back housing. The end of the leaf spring has riveted or otherwise secured thereto a member 18 that is I-shaped in section and of such size that the rubber blocks will lie between and bear against the flanges thereof.

The upper portion of the fitting 10 is of angular shape with a vertical portion 19 that is riveted or otherwise secured to the side frame and with an inwardly projecting lower portion that extends under the side frame. This fitting is provided with two chambers 20 adapted to receive rubber blocks 21 that support the inner ends of the front and rear springs respectively. Each of these chambers is in the form of a housing open at the bottom and with an opening 21a in its outer wall adapted to receive the end of the spring. The bottom opening is covered by a cap or closure plate 22 secured by cap screws 23 or the like. The end of the spring has a member 24 riveted thereto whose end is enlarged around the bent end of the spring, thus forming a large bearing surface. In each chamber is a block 25 of rubber, preferably a single piece, with a recess in its middle to receive the end of the leaf spring but otherwise filling the recess in the housing and being placed under compression by the pressure of the screws that hold the closure plate.

In the case of the end fittings, the blocks of rubber are wholly above and below the spring and do not reach the end walls of the chamber; and in consequence of this arrangement, the adjacent ends of the springs are free to move endwise to a limited extent in said fittings. In the case of the housings at the middle of the side frames, however, the recesses are completely filled with the rubber, and the leaf springs have very little or no capacity for moving endwise therein. The principal reason for this difference is to better enable the truck to ride over obstructions without materially deflecting the axle from its proper position at right angles to the track.

As this truck is especially designed for an underhung worm drive wherein the propeller shaft makes an angle with the ground, it is advantageous to mount the axle housing with its bottom tilted at substantially the same angle to the ground as that made by the propeller shaft, as this arrangement makes it feasible to use with an underhung worm drive the same axle housing of polygonal section that can be used with other types of drives. With pressed steel axle housings this arrangement is effected by means of a saddle plate or block 26 mounted on the top of the axle housing with its bottom inclined to rest flatwise against the inclined top of an axle housing and with depending shoulders that fit against the sides of the housing and with its ends prolonged and formed with vertical perforations therethrough for clamping bolts 27. The top of this saddle block is recessed to receive a block 28 of wood or other non-resonant material suitable for receiving and deadening the impact of the side frame thereon. Another saddle block 29 with side flanges is seated on the top of the leaf spring and has its top surface inclined and shouldered to fit against the bottom and sides of the housing. Its ends are also extended and provided with vertical perforations to receive said locking bolts. When the axle housing is made in the form of a casting the plates 26 and 29 may be dispensed with and lugs cast on the housing in lieu of said plates. A third saddle block 30 fits under the spring and is perforated to receive said bolts. Nuts 31 are threaded on the lower threaded ends of said bolts and serve to clamp the several parts firmly together. It is noted that the inclination of the bottom of the housing is upwardly from the end of the side frame toward the middle thereof.

In the construction shown, the truck bolster 2 is in the form of a hollow box girder comprising two side members 32 of substantially Z-shaped section arranged with their webs vertical and with their top flanges 33 facing outwardly, and with the bottom flanges 33a facing inwardly. The top of the truck bolster is covered by a cover plate 34 which rests on and is rigidly secured to the outstanding top flanges 33 of the Z-shaped side members 32 of said bolster; and the inwardly projecting bottom flanges 33a of said side members are connected by a bottom plate 34a which rests on said bottom flanges and is welded or otherwise rigidly secured thereto. The truck bolster 2 gradually decreases in depth from its middle towards each end where its upper portion is rigidly secured to the inwardly projecting top flange of the adjacent truck side frame 1 by means of a gusset plate 35. Each end of the truck bolster is also supported on and rigidly secured to the bottom flange of the adjacent truck side frame 1 by angle-shaped brackets 36 that are rigidly secured to said bottom flange and to the sides of the channel-shaped body portion 32 of the box girder bolster. The ends of the bottom plate 33a of the truck bolster are provided with depending end flanges 34b that are rigidly secured flatwise to the inner face of the vertical web of the adjacent side frame and thus form additional means for rigidly securing the ends of the truck bolster to the truck side frame members. This fixed bolster construction allows the truck to be built up as a complete rigid unit with no loose metallic parts, thereby eliminating transom and bolster maintenance and also eliminating noise.

At the center of the truck the top or cover plate 34 of the truck bolster 2 is provided with an opening 37 adapted to receive a supporting member or bracket 38 for the upstanding center or king pin 39 of the center bearing of the truck. The center bearing support 38 rests in the channel-shaped body portion 32 of the truck bolster 2 immediately below the opening 37 in the top plate 34 thereof and is bolted or otherwise rigidly secured to the bottom and side walls of said channel. The top of the center bearing support 38 is provided with a circular recess 40 having a central hole 41 adapted to receive and support the lower end of the center pin 39. The center pin 39 is firmly held in the hole 41 in the bottom of the circular recess 40 in the center bearing support 38, preferably by means of a cross pin 42, which extends through registering holes in said support and in the lower end of said center pin.

Firmly seated on the bottom of the circular recess 40 in the top of the center bearing support 38 is a circular cup bearing 43 having a central circular opening through which the center pin 39 projects. The cup bearing 43 has its upper surface formed into a concave bearing surface of spherical form. Resting on the concave bearing surface of the cup bearing 43 is an annular bearing member 44 whose lower surface is also spherical to fit the concave upper surface of said cup bearing. The annular bearing 44 loosely surrounds the center pin 39 and has a loose fit in the circular recess 40 in the center bearing support 38. The upper surface of the annular bearing member 44 is flat; and resting on this flat surface is a cylindrical bearing sleeve 45 which loosely surrounds the center pin 39. The cylindrical bearing sleeve is provided with an annular base flange 46 having a spherical surface adapted to engage the inner periphery of a hardened steel ring 40a which is press-fitted in an annular recess provided therefor in the upper end of the cicular recess 40 in the top of the center bearing support 38.

The portion of the bearing sleeve 45 located above its base flange 46 tapers slightly and fits in a tapered hole provided therefor in the center of the lowermost one of a pair of horizontally disposed rectangular center plates 47 and 48, the lowermost center plate 48 being supported on the base flange 46 of the bearing sleeve 45. The two center plates are separated by block 49 of rubber or other insulating material; and said plates and said block are provided at their centers with vertically alined holes adapted to receive the center pin, which fits loosely therein. The upper end of the center pin 39 extends into a recess 50 provided therefor in the bottom surface of the body bolster 51 of the car and is secured to the bolster by means of a locking member 52 slidably mounted in a cross slideway 53 provided therefor in the bottom surface of said bolster or in top of upper center plate 47. The locking member 52 is shown in the form of a plate whose inner end portion is bifurcated to closely embrace an annular groove 54 in the periphery of the center pin, thereby firmly securing the same to the body bolster.

The upper and lower center plates 47 and 48, respectively, are attached to the bottom flanges of the body bolster 51, with the rubber block 49 firmly clamped therebetween, by means of upstanding screw studs 55, which are threaded into bottom center plate 48 adjacent to the four corners thereof and extend loosely through registering openings provided therefor in the four corners of the upper center plate 47 and in the base flanges of said body bolster and are threaded at their upper ends to receive nuts 56. Preferably, washers of rubber or other suitable resilient insulating material are interposed between the nuts 56 and the base flanges of the body bolster. As shown in the drawings the opposing surfaces of the top and bottom center plates 47 and 48 are provided with marginal flanges and a series of longitudinal and cross ribs, the ribs of one plate being preferably arranged so that they do not register with those of the other plate. By this arrangement the rubber block is firmly clamped between the upper and lower center plates. By this mounting of center bearing plates, the body center plate 47 and the truck center plate 48 are firmly locked together against displacement by relative vertical movement, but are free to swing on a vertical axis or to tilt on a horizontal axis relative to each other. At the same time, the rubber serves to insulate the center bearing and not only deadens noise and jarring but affords additional flexibility to said bearing.

Each side bearing comprises horizontally disposed top and bottom side bearing plates 57 and 58 which extend inwardly over the truck side frame and outwardly beyond said side frame and are separated by a block 59 of rubber or other insulating material. The bottom side bearing plate 58 has a depending flange 60 riveted or otherwise rigidly secured to the outer side face of said side frame adjacent to the ends of the truck bolster; and the top and bottom side bearing plates are provided with marginal flanges thereby forming a seat for the insulating block 59 located between said plates. The longitudinal middle portion of the upper side bearing plate has an upwardly offset bearing surface for cooperation with a downwardly offset bearing surface on the bottom of the body bolster. The top bearing plate 57 is firmly clamped down on the rubber block 59 by means of depending screw studs 61, which are fixed to the four corners of said top plate having their lower ends threaded to receive nuts 62. The studs at the outer corners of the upper plate extend downwardly through openings provided therefor in the bottom rubber block 59 and the side bearing plate 58; and the studs at the inner corners extend downwardly through registering openings in the rubber block, the top flange of the side frame and the gusset plate 35, the stud holes in the bottom plate, side frame and gusset plate being large enough to permit limited horizontal sliding movement of these members relative to each other and to the top plate. With this construction of side bearing, the rubber pad is capable of yielding to permit tilting of the body bolster, it tends to prevent undue freedom of tilting and likewise tends to deaden the noise and jar incident thereto. Washers 63 of rubber or other insulating material are interposed between the nuts on the outer studs and the lower bearing plate and between the nuts on the inner studs and the gusset plate 35.

The hereinbefore described side and center bearing construction allows the truck to turn freely under the car and the body to roll or rock on the truck and to shift horizontally thereof in all directions; and it also serves to deaden the noise, jar and vibration and affords additional flexibility to said bearings, while the cushion connections formed by the rubber pads between ends of the truck springs and truck side frames cooperate with the side and center bearings to minimize jarring and jolting when stopping and starting the car.

What we claim is:

1. A street car construction comprising a truck, a body bolster, a center bearing comprising a center pin detachably secured to said truck and to said body bolster, a bearing sleeve loosely surrounding said center pin and supported on said truck for rotary and tilting movement, top and bottom center bearing plates supported on said bearing sleeve and provided with openings loosely surrounding said center pin, a block of rubber or the like located between said top and bottom bearing plates and fasteners extending through registering openings in said bolster, rubber block and the top and bottom bearing plates for securing the rubber block and bearing plates to the bolster.

2. A street car construction comprising a truck, a body bolster, a center bearing comprising a center pin detachably secured to said truck and to said body bolster, a bearing sleeve loosely surrounding said center pin and supported on said truck for rotary and tilting movement, top and bottom center bearing plates provided with openings adapted to loosely surround said center pin, a block of rubber or the like located between said top and bottom bearing plates, and fasteners extending through registering openings in said bolster, rubber block and the top and bottom bearing plates, nuts on the upper ends of said screw studs, and washers of rubber or the like on said screw studs between the nuts thereon and said body bolster, the openings in the bolster and top plate being larger than the fasteners which extend therethrough.

3. A street car construction comprising a truck, a body bolster, a center bearing comprising a center pin detachably secured to said truck and to said body bolster, a bearing sleeve loosely surrounding said center pin and supported on said truck for rotary and tilting movement, top and bottom center bearing plates supported on said bearing sleeve and provided with openings loosely surrounding said center pin, a block of rubber or the like confined between said top and bottom bearing plates, upstanding screw studs threaded on the bottom bearing plate and extending through registering openings in the rubber block top bearing plate and body bolster, nuts on the upper ends of said screw studs, and washers of rubber or the like on said screw studs between the nuts thereon and said body bolster.

4. A street car construction comprising a truck, axle housings, leaf springs having their middle portions secured to said axle housings, blocks of rubber or the like mounted on said truck and adapted to receive the ends of said springs, a body bolster, a center bearing including a center pin secured to said truck and to said body bolster, top and bottom center plates secured to said body bolster and having openings for the center pin, a support on said truck for the bottom center plate, and a block of rubber or the like located between said top and bottom bearing plates.

5. A street car construction comprising a truck, axle housings, leaf springs having their middle portions secured to said axle housings, blocks of rubber or the like mounted on said truck and adapted to receive the ends of said springs, a body bolster, a center bearing including a center pin secured to said truck and to said body bolster, top and bottom center plates secured to said body bolster, and having openings for the center pin, a rotatable and tiltable support on said truck for the bottom center plate, a block of rubber or the like located between said top and bottom bearing plates, side bearings comprising top and bottom plates secured to said truck beneath the body bolster, and a block of rubber clamped between the top and bottom bearing plates of each side bearing.

6. A street car construction comprising a truck, a body bolster, a center bearing comprising a center bearing support secured to said truck and provided at its top with a circular recess having a central opening in the bottom thereof, a center pin having its lower end seated in said opening and its upper end secured to said body bolster, an annular cup bearing firmly seated in said recess and having a spherical upper surface, an annular bearing member having a spherical bottom surface resting on the spherical top surface of said cup bearing, a cylindrical sleeve resting on said bearing member, top and bottom bearing plates secured to said body bolster, and having openings adapted to receive said center pin, the bottom plate being supported on said bearing sleeve, and a block of rubber or the like located between said top and bottom center plates, said center pin loosely fitting the openings in the annular bearing, cylindrical sleeve, and top and bottom bearing plates.

7. A truck for street cars comprising side frames, end members rigidly connecting the ends of said side frames, and a bolster in the form of a hollow box girder rigidly connecting the middle portions of said side frames, said bolster comprising two side members of substantially Z-shaped section arranged with their webs vertical, with their top flanges facing outwardly and with their bottom flanges facing inwardly, a cover plate resting on and rigidly secured to the top flanges of said side members, and a bottom plate resting on and rigidly secured to the bottom flanges of said side members.

8. A truck for street cars comprising side frames, end members rigidly connecting the ends of said side frames, and a bolster in the form of a hollow box girder rigidly connecting the middle portions of said side frames, said bolster comprising two side members of substantially Z-shaped section arranged with their webs vertical, with their top flanges facing outwardly and with their bottom flanges facing inwardly, a cover plate resting on and rigidly secured to the top flanges of said side members, and a bottom plate resting on and rigidly secured to the bottom flanges of said side members, said bottom plate having depending end flanges rigidly secured to said side frames.

9. A truck for street cars comprising side frames, end members rigidly connecting the ends of said side frames, and a bolster in the form of a hollow box girder rigidly connecting the middle portions of said frames, said bolster comprising two side members of substantially Z-shaped section arranged with their webs vertical, with their top flanges facing outwardly and with their bottom flanges facing inwardly, a cover plate resting on and rigidly secured to the top flanges of said side members, a bottom plate resting on and rigidly secured to the bottom flanges of said side members, said bottom plate having depending end flanges rigidly secured to said side frames, gusset plates rigidly secured to the top of said bolster and the tops of the adjacent side frames, and angle brackets rigidly secured to said bolster and to the said side frames.

10. A street car construction comprising a truck, a body bolster, a center bearing comprising a center pin detachably secured to said truck and to said body bolster, a bearing sleeve loosely surrounding said center pin and supported on said truck for rotary and tilting movement, and a center bearing plate supported on said bearing sleeve and supporting said body bolster.

11. A street car construction comprising a truck provided at its center with a circular recess having an opening in the bottom thereof, a body bolster, a center pin having its lower end seated in said opening and its upper end secured to said body bolster, an annular cup bearing seated in said recess and having a spherical upper surface, an annular bearing member having a spherical bottom surface resting on the spherical upper surface of said cup bearing, a cylindrical sleeve resting on said bearing member, and a plate supported on said bearing sleeve and secured to said body bolster and provided with an opening adapted to receive said center pin, said center pin loosely fitting the openings in said annular bearing, said cylindrical sleeve, and said plate.

Signed at Detroit, Michigan, this 15th day of November, 1927.

HERBERT W. ALDEN.
NELSON R. BROWNYER.